(12) United States Patent
Yano

(10) Patent No.: US 6,498,562 B2
(45) Date of Patent: Dec. 24, 2002

(54) SEAT BELT BUCKLE ENGAGEMENT DETECTOR AND SEAT BELT SYSTEM

(75) Inventor: Ryuji Yano, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/725,492

(22) Filed: Nov. 30, 2000

(65) Prior Publication Data

US 2001/0002816 A1 Jun. 7, 2001

(30) Foreign Application Priority Data

Dec. 1, 1999 (JP) .............................. 11-341583

(51) Int. Cl.[7] ................................. B60Q 1/00
(52) U.S. Cl. ................. 340/457.1; 340/686.4; 340/687; 180/270
(58) Field of Search ................. 180/270, 283; 200/61.58 B; 307/10.1, 10.3; 340/457.1, 457, 686.4, 687; 701/45, 46, 47

(56) References Cited

U.S. PATENT DOCUMENTS 4,107,645 A * 8/1978 Lewis et al. ................. 340/635
6,184,785 B1 * 2/2001 Midorikawa ............. 340/457.1

* cited by examiner

*Primary Examiner*—Daryl Pope
(74) *Attorney, Agent, or Firm*—Kanesaka & Takeuchi

(57) ABSTRACT

A seat belt buckle engagement detector of the invention includes a by-pass or direct circuit for supplying electricity from a battery to one end of a seat belt warning lamp through a current limiting resistance. With this by-pass circuit, even if an ignition switch is turned off, in case a buckle switch is turned on, a signal of a ground potential is inputted to a seat belt system. In case the buckle switch is turned off, a signal of a potential corresponding to a voltage of the battery is inputted to the seat belt system. Thus, the seat belt system can carry out a desired process even under a condition where the ignition switch is turned off.

8 Claims, 5 Drawing Sheets

SEAT BELT BUCKLE ENGAGEMENT DETECTOR AND SEAT BELT SYSTEM

BACKGROUND OF THE INVENTION AND RELATED ART STATEMENT

The invention relates to a seat belt buckle engagement detector for detecting engagement of a buckle and a tongue plate of a seat belt to detect that a passenger wears the seat belt, and a seat belt system for warning non-wearing of the seat belt and controlling a seat belt retraction.

In a vehicle, such as an automobile, while driving, a passenger has an obligation to wear a seat belt. The seat belt includes web portions attached to a seat and to a retractor. When the seat belt is worn, the web retracted in the retractor is pulled out and a tongue plate attached to a forward end thereof is engaged with a buckle fixed to the seat.

A switch, i.e. buckle switch, for detecting engagement of the buckle and the tongue plate is provided in the buckle. When the buckle and the tongue plate are not engaged with each other, a contact point thereof is turned on, and when the buckle and the tongue plate are engaged with each other, the contact point thereof is turned off.

The automobile includes a seat belt system which controls such that when the seat belt is not worn or put on, an engine does not start; the automobile does not run; or the passenger is warned by a sound. Recently, it has been proposed that retraction of the seat belt is carried out by a motor and control thereof is performed by the seat belt system.

FIG. 5 is a schematic view showing a conventional seat belt buckle engagement detector. A power source from a battery 21 is supplied to one end of a seat belt warning lamp 24 through an ignition switch 22 and a fuse 23. The other end of the seat belt warning lamp 24 is grounded through a buckle switch 25. A voltage on a side of the buckle switch of the seat belt warning lamp 24 is inputted into a seat belt system 26. The other display lamps 27 are connected parallel to the seat belt warning lamp 24.

When the ignition switch 22 is turned on, in case the buckle and the tongue plate are not engaged with each other, since the buckle switch 25 is turned on, the seat belt warning lamp 24 is lighted on, and at the same time, a signal of an earth potential is inputted to the seat belt system 26. In case the buckle and the tongue plate are engaged with each other, the buckle switch 25 is turned off, the seat belt warning lamp 24 is turned off, and at the same time, a signal of a potential corresponding to a voltage of the battery 21 is inputted into the seat belt system 26.

As described above, the conventional seat belt buckle engagement detector starts its operation only when the ignition switch 22 is turned on. Therefore, while the ignition switch 22 is turned off, the seat belt warning lamp 24 is held in a light-off state, so that the potential to be inputted to the seat belt system 26 becomes unstable. Therefore, in the seat belt system 26, the input is connected to a positive voltage through a pull-up resistance or is connected to an earth potential through a pull-down resistance to thereby prevent the input signal from being unstable.

In the normal state, in case the ignition switch is not turned on, since the automobile does not run, it seems that there is no necessity for wearing of the seat belt to be detected in this state. However, the automobile may be driven by an outer force, such as hauling. In such a case, even if the ignition switch is not turned on, it is necessary to detect a wearing condition of the seat belt. Also, when a passenger gets on the automobile, it is preferable that the seat belt is worn before the ignition key is turned on.

In view of the above problem, the present invention has been made, and an object of the invention is to provide a seat belt buckle engagement detector, wherein even if an ignition key is not turned on, wearing of a seat belt can be detected to thereby provide a warning sign and carry out other controls.

Further objects and advantages of the invention will be apparent from the following description of the invention.

SUMMARY OF THE INVENTION

According to a first aspect of the present invention to attain the above object, a seat belt buckle engagement detector includes a device for detecting engagement of a buckle and a tongue plate of a seat belt even in case an ignition switch of an automobile is turned off.

In the device, even if the ignition switch of the automobile is turned off, since engagement of the buckle and the tongue plate is detected, even in case the automobile is driven by hauling, a warning for wearing a seat belt can be provided. Also, even before a passenger gets on the automobile and turns on the ignition switch, a warning sign for wearing the seat belt can be provided and a seat belt retraction control can be carried out.

According to a second aspect of the invention to attain the above object, in the first aspect, the seat belt buckle engagement detector has a function for turning on or off the device for detecting the engagement of the buckle and the tongue plate even in case the ignition switch of the automobile is turned off by an output of a seat belt system.

In the first aspect, even in case the ignition switch of the automobile is turned off, since there is provided the device for detecting the engagement of the buckle and the tongue plate, under certain circumstances, there may be a case where an electric current of a battery is consumed by a current flowing to the detecting device. However, in the second aspect, the device for detecting the engagement of the buckle and the tongue plate can be turned on or off by the output of the seat belt system even in case the ignition switch of the automobile is turned off. For example, in case a power source of the seat belt system is not turned on, even if the ignition switch of the automobile is turned off, the current of the battery can be prevented from being consumed by turning off the device for detecting the engagement of the buckle and the tongue plate.

Incidentally, the "seat belt system" mentioned in the present specification is a system for carrying out operations relative to the seat belt, such as generating a seat belt wearing warning, retracting the seat belt and controlling the seat belt.

According to a third aspect of the present invention to attain the above object, in the seat belt buckle engagement detector as stated in the first aspect, there is provided a seat belt buckle engagement detector, wherein the device for detecting the engagement of the buckle and the tongue plate has a detecting function even if a warning lamp for showing non-engagement of the buckle and the tongue plate of the seat belt is broken.

In the seat belt buckle engagement detector as shown in FIG. 5 and explained in the prior art section, when the seat belt warning lamp 24 is broken, the seat belt system can not detect that the buckle switch is turned on or off. In the third aspect, however, the device for detecting the engagement of the buckle and the tongue plate does not lose its detecting function even when the warning lamp for showing that the buckle and the tongue plate of the seat belt are not engaged with each other is broken. Even in such a case, the seat belt system can detect the seat belt buckle engagement.

According to a fourth aspect of the invention to attain the above object, there is provided a seat belt system including the seat belt buckle engagement detector as stated in the first aspect.

Since the present seat belt system includes the seat belt buckle engagement detector as stated in the first aspect, the engagement of the buckle and the tongue plate of the seat belt can be detected even in case the engagement can not be detected in the conventional seat belt buckle engagement detector to thereby carry out predetermined operations of the system.

According to a fifth aspect of the invention to attain the above object, in the fourth aspect, there is provided a seat belt system having a function for displaying a warning showing that the buckle and the tongue plate of the seat belt are not engaged with each other.

Since the seat belt system of the present aspect has the function for displaying the warning showing that the buckle and the tongue plate of the seat belt are not engaged with each other even if the ignition switch of the automobile is turned off, the seat belt system can provide a warning for putting on the seat belt even in case the automobile is driven by hauling. Also, the seat belt system can provide a warning to put on the seat belt even before a passenger gets on the automobile and turns on the ignition switch.

DETAILED DESCRIPTION OF PREFERRED EMBODIMENTS

Figure 1:
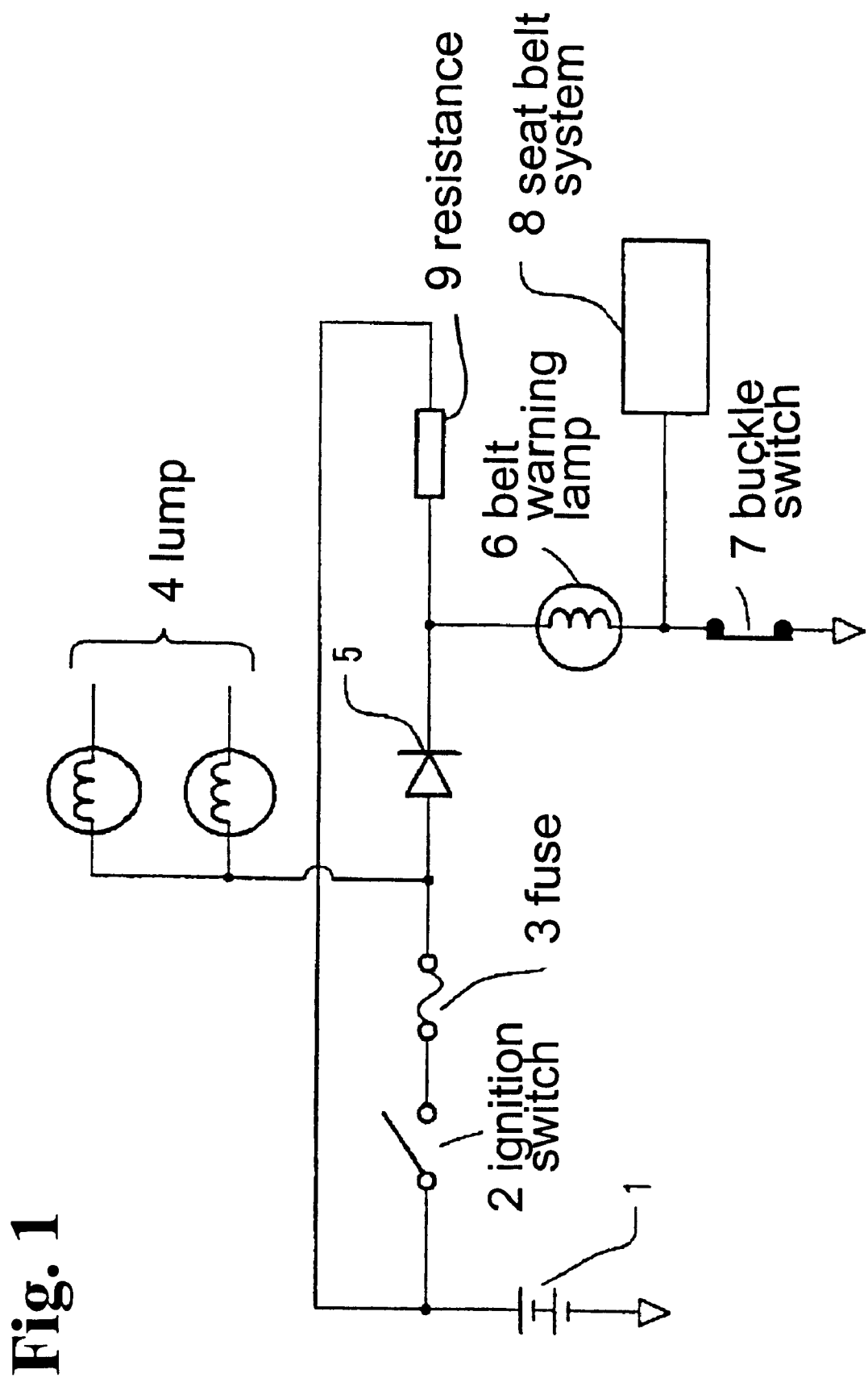
FIG. 1 is a schematic view showing a structure of a first embodiment of a seat belt buckle engagement detector and a seat belt system according to the present invention.

Hereunder, embodiments of the present invention are explained with reference to the accompanying drawings. FIG. 1 is a schematic view showing a structure of a seat belt buckle engagement detector and a seat belt system of a first embodiment according to the present invention. In FIG. 1, reference numeral 1 is a battery; 2 is an ignition switch; 3 is a fuse; 4 is display lamps; 5 is a reverse-flow preventing diode; 6 is a seat belt warning lamp; 7 is a buckle switch; 8 is a seat belt system; and 9 is a current limiting resistance.

A power or voltage from the battery 1 is supplied to the respective display lamps 4 through the ignition switch 2 and the fuse 3, and also, supplied to one end of the seat belt warning lamp 6 through the reverse-flow preventing diode 5. The other end of the seat belt warning lamp 6 is grounded through the buckle switch 7. A voltage on the buckle switch side of the seat belt warning lamp 6 is inputted to the seat belt system 8.

When the ignition switch 2 is turned on, since the buckle switch 7 is turned on in case a buckle and a tongue plate are not engaged with each other, the seat belt warning lamp 6 is lighted up, and at the same time, a signal having an earth potential is inputted to the seat belt system 8. When the buckle and the tongue plate are engaged with each other, the buckle switch 7 is turned off, the seat belt warning lamp 6 is turned off, and a signal with a potential corresponding to a voltage of the battery 1 is inputted to the seat belt system 8.

In the present embodiment, in addition to the above-stated circuit, there is provided a by-pass circuit or direct line for supplying an electric current from the battery 1 to one end of the seat belt warning lamp 6 through the current limiting resistance 9. Since a value of the current limiting resistance 9 is sufficiently large, even if the buckle switch 7 is turned on, the seat belt warning lamp 6 is not lighted. Thus, when the ignition switch 2 is turned off, the current consumed in the by-pass circuit is extremely small.

Through the by-pass circuit, even if the ignition switch 2 is turned off, when the buckle switch 7 is turned on, a signal having a ground potential is inputted to the seat belt system 8, and when the buckle switch 7 is turned off, a signal having a potential corresponding to a voltage of the battery 1 is inputted to the seat belt system 8. Thus, even when the ignition switch 2 is turned off, the seat belt system 8 can carry out a predetermined process.

Incidentally, since the reverse-flow preventing diode 5 is provided, when the ignition switch 2 is turned off, the current from the by-pass circuit does not enter an ignition line or the respective display lamps 4.

Figure 2:
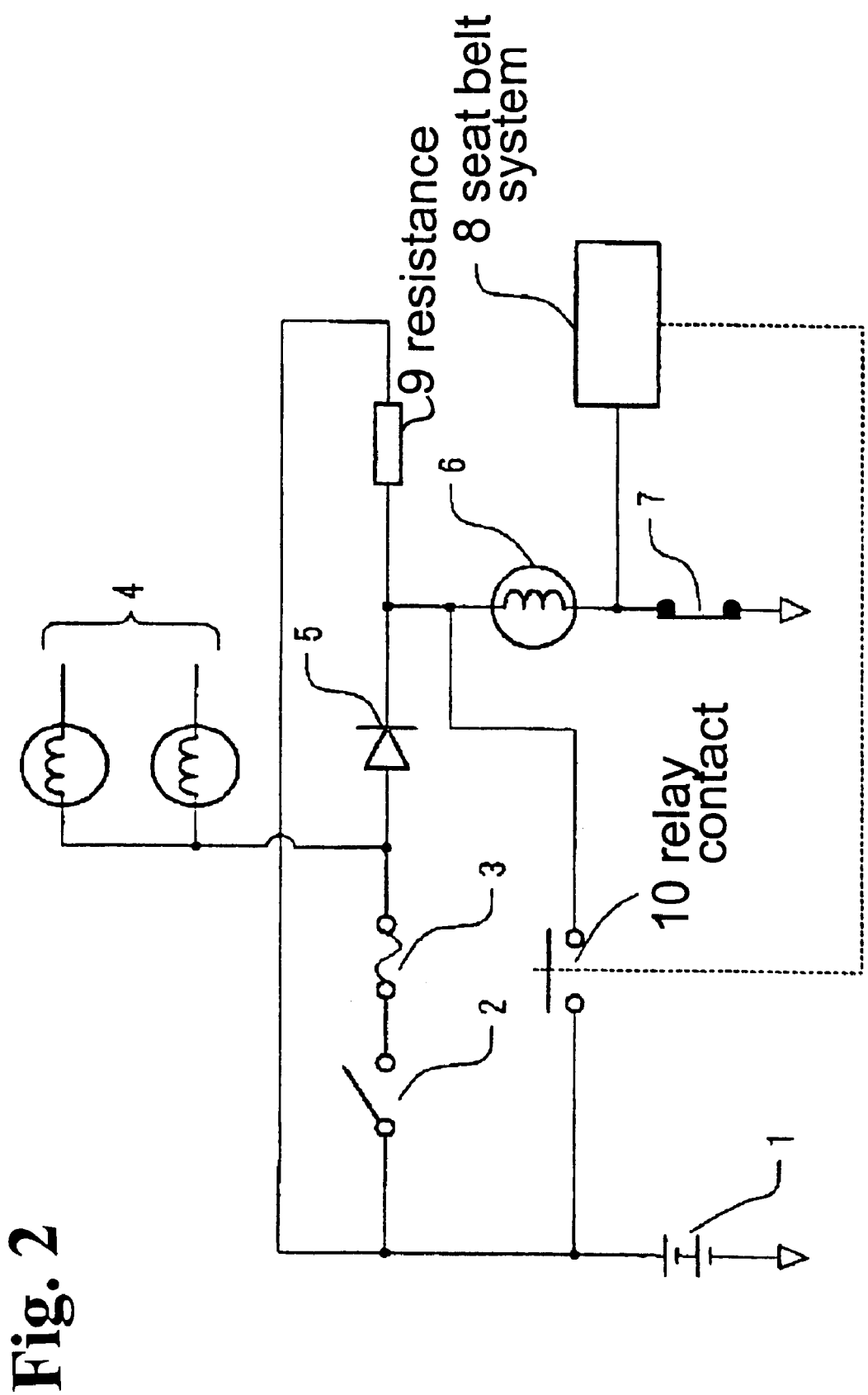
FIG. 2 is a schematic view showing a structure of a second embodiment of a seat belt buckle engagement detector and a seat belt system according to the present invention.

FIG. 2 is a schematic view showing a structure of a second embodiment of a seat belt buckle engagement detector and a seat belt system according to the present invention. In the following drawings, the same constitutional elements as those in the precedent drawings are represented by the same symbols and their explanations are omitted. In FIG. 2, reference numeral 10 is a relay contact.

The second embodiment shown in FIG. 2 is different from the structure shown in FIG. 1 in that there is provided a path or line for supplying a current of the battery through the relay contact 10 to the seat belt warning lamp 6, and that the relay contact 10 is controlled by the seat belt system 8. Thus, only the different points are explained and explanations of other points are omitted.

In the present embodiment, even if the ignition switch 2 is turned off, when the seat belt system 8 determines that it is necessary that the seat belt warning lamp 6 is lighted up, the relay contact 10 is closed. Thereupon, a current is supplied to the seat belt warning lamp 6 from the battery 1, the buckle switch 7 is naturally turned on, and the seat belt warning lamp 6 is lighted up. In case a power source of the seat belt system 8 is not turned on, the relay contact 10 is made open, so that a useless current can be prevented from being consumed.

Figure 3:
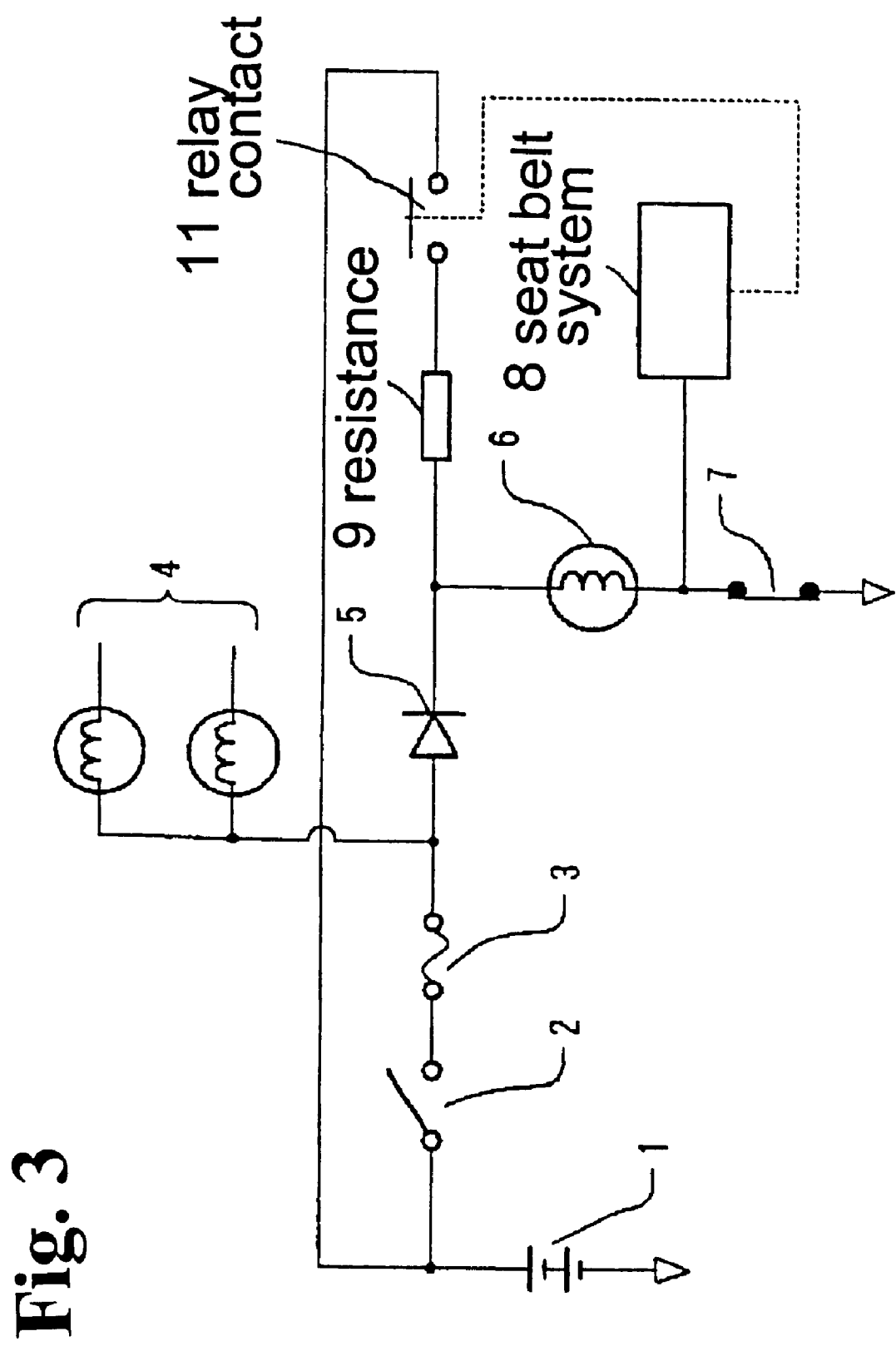
FIG. 3 is a schematic view showing a structure of a third embodiment of a seat belt buckle engagement detector and a seat belt system according to the present invention.

FIG. 3 is a schematic view showing a structure of a third embodiment of a seat belt buckle engagement detector and a seat belt system according to the invention. In FIG. 3, reference numeral 11 is a relay contact.

The third embodiment shown in FIG. 3 is different from the embodiment shown in FIG. 1 in that a relay contact 11 is provided in the path for supplying the current of the battery to the seat belt warning lamp 6 through the current limiting resistance 9, and the relay contact 11 is controlled by the seat belt system 8. Only the different point is explained and explanations of other points are omitted.

In the present embodiment, only when the relay contact 11 is closed by the seat belt system 8, the by-pass circuit works. Thus, while the ignition switch 2 is turned off, only when the seat belt system 8 determines to be necessary, a power is supplied to the circuit including the current limiting resistance 9, seat belt warning lamp 6 and buckle switch 7. Thus, as compared with the first embodiment shown in FIG. 1, the consumed power can be further reduced. Also, by reducing a resistance value of the current limiting resistance 9, the seat belt warning lamp 6 can be darkened.

Figure 4:
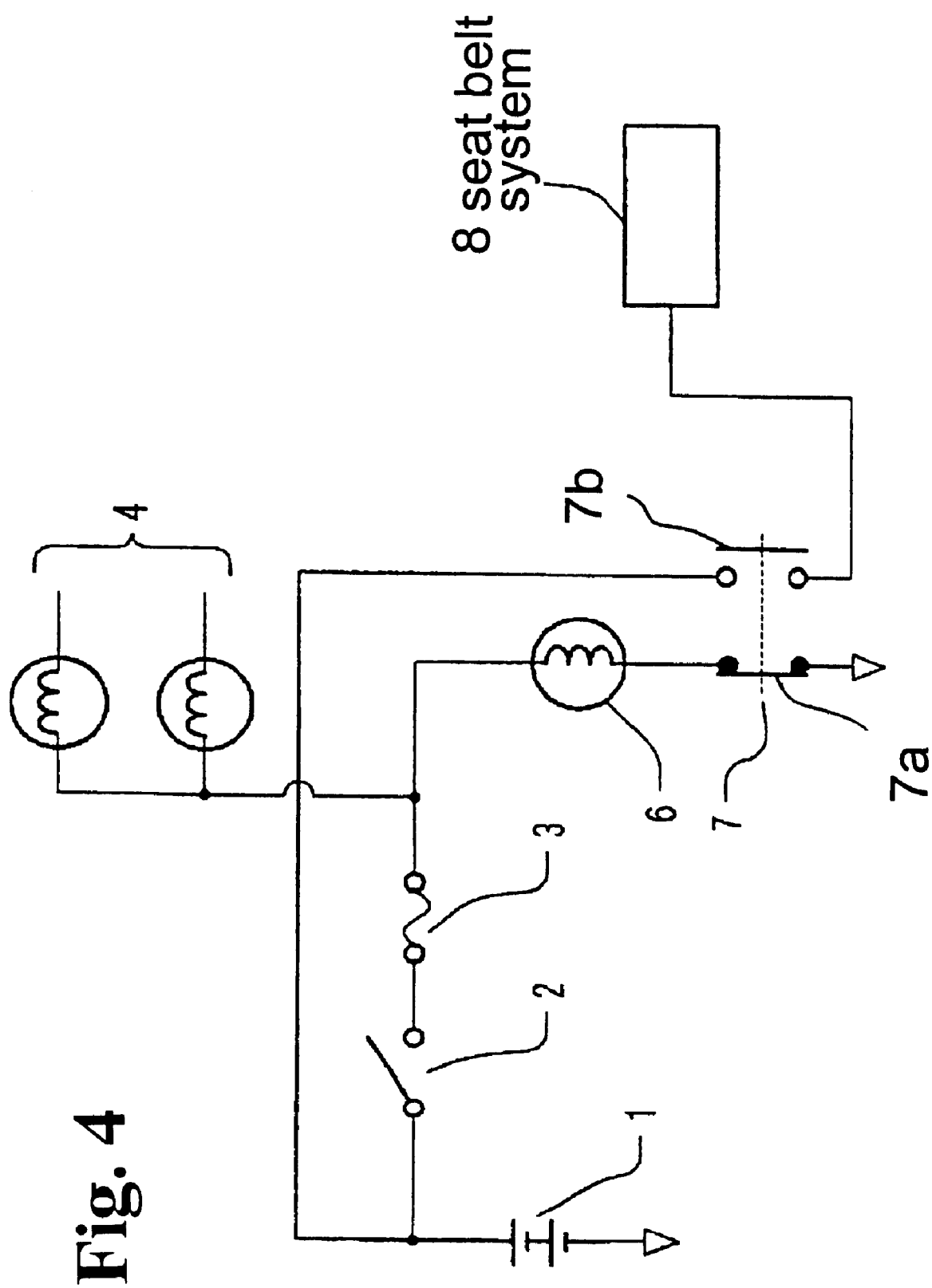
FIG. 4 is a schematic view showing a structure of a fourth embodiment of a seat belt buckle engagement detector and a seat belt system according to the present invention.
Figure 5:
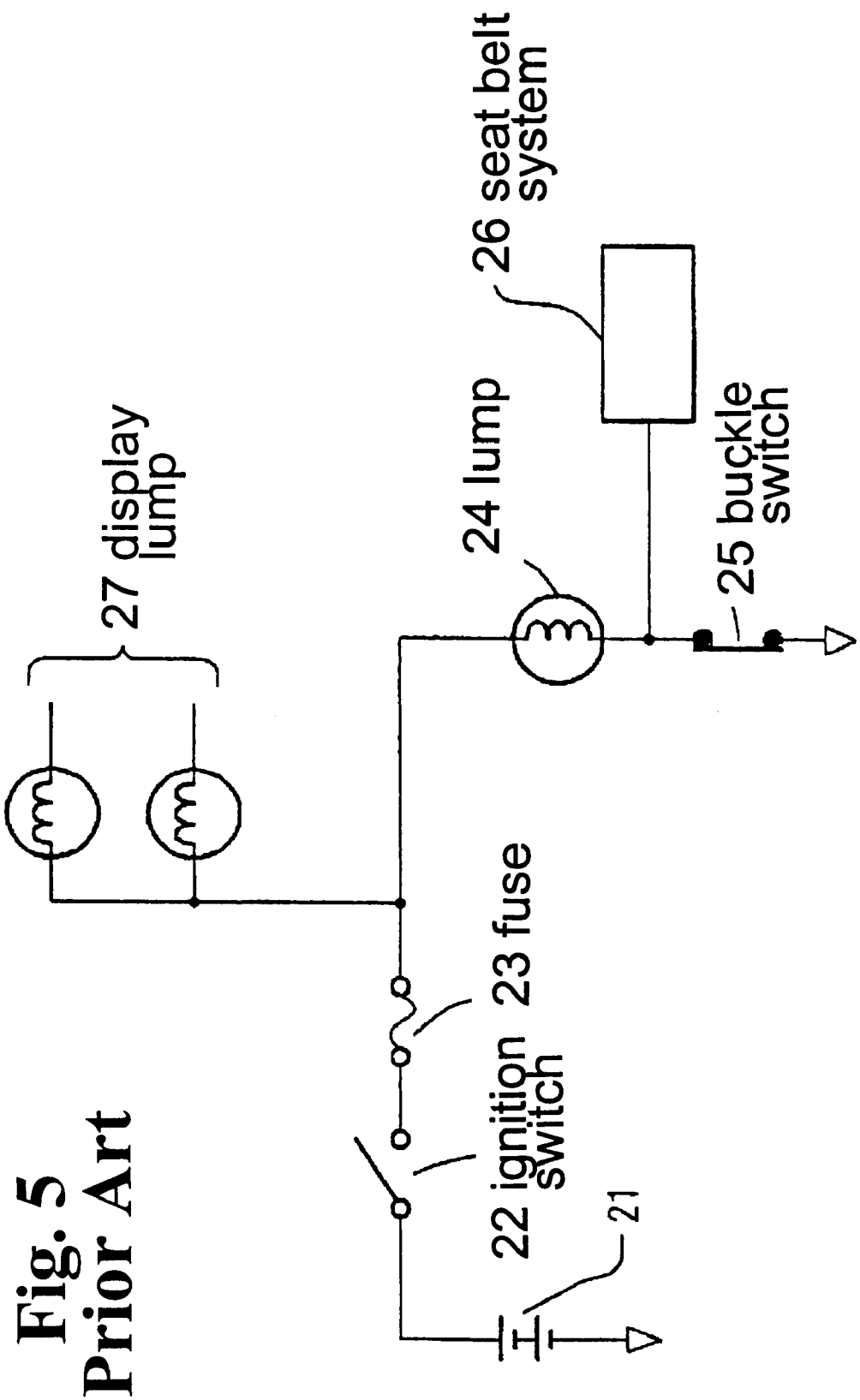
FIG. 5 is a schematic view showing a structure of a conventional seat belt buckle engagement detector.

FIG. 4 is a schematic view showing a structure of a fourth embodiment of a seat belt buckle engaging detector and a seat belt system according to the present invention. The present embodiment is different from the prior art shown in FIG. 5 only in that the buckle switch 7 has two contact points 7a, 7b. One contact point 7a is used in the same manner as in the prior art, and the other contact point 7b is used for inputting a potential of the battery 1 to the seat belt system 8. Therefore, only the different point is explained and explanations of other points are omitted. Incidentally, an input to the seat belt system 8 is connected to a ground level through a pull-down resistance.

In the present embodiment, the contact point 7a of the buckle switch 7 connected to the seat belt warning lamp 6 and the contact point 7b of the buckle switch 7 connected to the seat belt system are different. Therefore, for example, even if the seat belt warning lamp 6 is broken or becomes a defective contact, an engagement of the buckle and the tongue plate can be detected.

As described above, according to the first aspect of the invention, even if an automobile is driven by hauling, a warning for putting on a seat belt can be generated. Also, even before a passenger gets on the automobile and turns on the ignition switch, the seat belt wearing warning can be produced, or a seat belt retracting control can be made.

According to the second aspect of the invention, in addition to the above advantages, the battery current can be prevented from being consumed uselessly.

According to the third aspect of the invention, in addition to the above, even if the seat belt warning lamp is broken, the engagement of the seat belt buckle can be detected.

According to the fourth aspect of the invention, the engagement of the buckle and the tongue plate can be detected even in a situation that the engagement in the prior art can not be detected, and predetermined operations can be carried out.

According to the fifth aspect of the invention, even if an automobile is driven by hauling, a warning for wearing the seat belt can be generated. Also, even before a passenger gets on the automobile and turns on an ignition switch, the warning for wearing the seat belt can be generated.

While the invention has been explained with reference to the specific embodiments of the invention, the explanation is illustrative and the invention is limited only by the appended claims.

What is claimed is:

1. A seat belt buckle engagement detector comprising:
   a buckle switch for detecting an engagement of a buckle and a tongue plate of a seat belt,
   a detection device connected to the buckle switch for detecting the engagement of the buckle and the tongue plate and indicating the same,
   a power source,
   an ignition line connected between the detection device and the power source, and having an ignition switch of an automobile and a reverse-flow preventing device for allowing electricity in the ignition line to flow only from the power source to the buckle switch so that when the ignition switch is turned on, the detection device is actuated to indicate a condition of the buckle switch through the ignition line, and
   a direct line directly connected between the power source and the detection device and having a resistance therein to reduce a power supplied from the power source to the detection device, said power flowing through the direct line being prevented from flowing to the ignition switch by the reverse-flow preventing device so that in case the ignition switch is turned off, the power reduced by the resistance is supplied to the detection device to be able to indicate a condition of the buckle switch.

2. A seat belt buckle engagement detector according to claim 1, wherein said detection device is a warning lamp connected to the buckle switch in series, said direct line and said ignition line being arranged parallel to each other between the warning lamp and the power source.

3. A seat belt buckle engagement detector according to claim 2, further comprising a seat belt system connected between the warning lamp and the buckle switch, an additional line situated between the power source and the warning lamp, and a relay switch connected to the seat belt system and situated in the additional line for providing electricity from the power source to the warning lamp, said relay switch being actuated by the seat belt system.

4. A seat belt buckle engagement detector according to claim 2, further comprising a seat belt system connected between the warning lamp and the buckle switch, and a relay switch connected to the seat belt system and situated in said direct line with the resistance for providing electricity from the power source to the warning lamp when the relay switch is actuated by the seat belt system.

5. A seat belt buckle engagement detector according to claim 1, further comprising a seat belt system, and an actuating device for actuating the detecting device connected to the seat belt system so that the detecting device is turned on or off by an output of the seat belt system in a state where the ignition switch of the automobile is turned off.

6. A seat belt system having said seat belt buckle engagement detector according to claim 1.

7. A seat belt system having said seat belt buckle engagement detector according to claim 6, wherein said detection device is a warning display showing that the buckle and the tongue plate of the seat belt are not engaged with each other in a condition where the ignition switch of the automobile is turned off.

8. A seat belt buckle engagement detector according to claim 2, further comprising a seat belt system connected between the buckle switch and the detection device.

* * * * *